(12) United States Patent
Rabinowitz et al.

(10) Patent No.: US 6,738,176 B2
(45) Date of Patent: May 18, 2004

(54) DYNAMIC MULTI-WAVELENGTH SWITCHING ENSEMBLE

(76) Inventors: Mario Rabinowitz, 715 Lakemead Way, Redwood City, CA (US) 94062; Mark Davidson, 807 Rorke Way, Palo Alto, CA (US) 94303

( * ) Notice: Subject to any disclaimer, the term of this patent is extended or adjusted under 35 U.S.C. 154(b) by 125 days.

(21) Appl. No.: 10/135,073

(22) Filed: Apr. 30, 2002

(65) Prior Publication Data

US 2003/0202235 A1 Oct. 30, 2003

(51) Int. Cl.⁷ .......................... G02B 26/00; G09G 3/36
(52) U.S. Cl. ..................................... 359/296; 345/107
(58) Field of Search .......................... 345/107; 359/290, 359/296; 385/18

(56) References Cited

U.S. PATENT DOCUMENTS

| | | | | |
|---|---|---|---|---|
| 5,815,306 A | * | 9/1998 | Sheridon et al. | 359/296 |
| 5,825,529 A | * | 10/1998 | Crowley | 359/296 |
| 5,960,132 A | * | 9/1999 | Lin | 385/18 |
| 6,227,673 B1 | * | 5/2001 | O'Hara-Smith | 359/850 |
| 6,415,070 B1 | * | 7/2002 | Munoz-Bustamante et al. | 385/24 |
| 6,504,525 B1 | * | 1/2003 | Knights | 345/107 |
| 6,570,700 B2 | * | 5/2003 | Engler et al. | 359/296 |
| 6,587,611 B1 | * | 7/2003 | Hunt | 385/18 |
| 6,612,705 B1 | * | 9/2003 | Davidson et al. | 359/851 |
| 2002/0131150 A1 | * | 9/2002 | Engler et al. | 359/296 |
| 2002/0131151 A1 | * | 9/2002 | Engler et al. | 359/296 |
| 2003/0117424 A1 | * | 6/2003 | Kinoshita et al. | 345/700 |

OTHER PUBLICATIONS

U.S. patent application Ser. No. 2002/0131151A1(Sep. 12, 2002) Engler et al. Microstructured Segmented Electrode Film For Electronic Displays.
U.S. patent application Ser. No. 5,815,306(Sep. 29, 1998) Sheridon et al. Eggcrate . . .
U.S. patent application Ser. No. 6,097,531 (Aug. 1, 2000) Sheridon, Method of Making Uniformly Magnetized Elements for a Gyricon Display.
U.S. patent application Ser. No. 6,197,228 B1 Sheridon, Method of Making a Gyricon Display Using Magnetic Latching, (Mar. 6, 2001).
U.S. patent application Ser. No. 6,211,998 B1 (Apr. 3, 2001) Sheridon, Magnetic Unlatching and Addressing of a Gyricon Display.
U.S. patent application Ser. No. 6,262,707 B1(Jul. 17, 2001)Sheridon, Gyricon Displays Utilizing.
Magnetic Addressing and Latching Mechanism U.S. patent application Ser. No. 6,323,989 B1 (Jacobson et al., Electrophoretic Displays Using Nanoparticles), (Nov. 27, 2001).
U.S. patent application Ser. No. 6,249,271 B1 (Albert et al, Retroreflective electrophoretic Displays and Materials for Making the Same), (Jun. 19, 2001).
U.S. patent application Ser. No. 6,262,706 B1 (Albert et al, Retroreflective Electrophoretic Displays and Materials for Making the Same), (Jul. 17, 2001).
U.S. patent application Ser. No. 6,120,588 (Jacobson, Electronically Addressable Microencapsulated Ink and Display Thereof), (Sep. 19, 2000).
U.S. patent application Ser. No. 6,120,839 (Comiskey et al., (Electro–Osmotic Displays and Materials for Making the Same), (Sep. 19, 2000).
U.S. patent application Ser. No. 6,241,921 B1 (Jacobson et al., Heterogeneous Display Elements and Methods for Their Fabrication), (Jun. 5, 2000).
U.S. patent application Ser. No. 6,192,890 B1 (Feb. 27, 2001)Levy et al., Changeable Tattoos.

\* cited by examiner

*Primary Examiner*—David N. Spector (57) ABSTRACT

This invention deals with a novel general concept for a multi-wavelength switching ensemble which is controlled electrically, electromagetically, or magnetically. A switching system is presented that permits the input to control the output. It allows a full 180 degree rotation of the beam which greatly exceeds the rotational capability of conventional systems. Furthermore, the instant invention permits less costly and greater ease of manufacture.

21 Claims, 7 Drawing Sheets

DYNAMIC MULTI-WAVELENGTH SWITCHING ENSEMBLE

BACKGROUND OF THE INVENTION

1. Field of the Invention

The instant invention relates to a multi-wavelength switching ensemble which performs switching operations by electrically, electromagetically, or magnetically controlling the direction in which an electromagnetic radiation signal-beam, from optical wavelengths through microwave wavelengths, The present invention permits the input to control the output. It allows a full 180 degree rotation of the beam which greatly exceeds the rotational capability of conventional systems. Furthermore, the instant invention permits less costly and greater ease of manufacture.

2. Description of the Prior Art

The processes as taught herein are uniquely distinct and different from the prior art. This invention relates generally to method and apparatus for switching electromagnetic beams by an active reflecting multi-wavelength system of a dynamic ensemble of mini-mirrors. A large representative sample of 32 prior art U.S. patents will next be enumerated. This together with the references contained therein constitutes a comprehensive compendium of the prior art showing that our invention operates totally differently than the prior art.

1. U.S. Pat. No. 6,374,018 Optical switch, method of operating optical switch, and method of designing optical switch.
2. U.S. Pat. No. 6,374,010 Optical switch.
3. U.S. Pat. No. 6,374,009 TEMC fiber based optical switch.
4. U.S. Pat. No. 6,374,008 Multi-wavelength cross-connect optical switch.
5. U.S. Pat. No. 6,362,556 Electrically actuated optical switch having a surface pivotable Mirror.
6. U.S. Pat. No. 6,360,036 MEMS optical switch and method of manufacture.
7. U.S. Pat. No. 6,360,033 Optical switch incorporating therein shallow arch leaf springs.
8. U.S. Pat. No. 6,347,168 Optical switch and optical switch system.
9. U.S. Pat. No. 6,330,102 Apparatus and method for 2-dimensional steered-beam NxM optical switch using single-axis mirror arrays and relay optics.
10. U.S. Pat. No. 6,320,997 Self-aligning 1xN rotary optical switch.
11. U.S. Pat. No. 6,320,996 Wavelength selective optical switch.
12. U.S. Pat. No. 6,314,215 Fast all-optical switch.
13. U.S. Pat. No. 6,292,597 N.times.N non-blocking optical switch.
14. U.S. Pat. No. 6,289,145 Multi-wavelength cross-connect optical switch
15. U.S. Pat. No. 6,268,952 Micromechanical light steering optical switch.
16. U.S. Pat. No. 6,263,125 Integrated optical switch array.
17. U.S. Pat. No. 6,229,640 Microelectromechanical optical switch and method of manufacture thereof.
18. U.S. Pat. No. 6,222,955 Integrated 1.times.N optical switch.
19. U.S. Pat. No. 6,212,151 Optical switch with coarse and fine deflectors.
20. U.S. Pat. No. 6,181,843 Optical switch of surface transmission type by one-dimensional array method.
21. U.S. Pat. No. 6,151,431 Compact non-blocking non-dilated optical switch using mode conversion.
22. U.S. Pat. No. 6,141,126 Wave division multiplexing based optical switch.
23. U.S. Pat. No. 6,128,115 Optical switch device.
24. U.S. Pat. No. 6,075,910 Method and apparatus for controlling an electro-optical switch.
25. U.S. Pat. No. 6,031,947 1.times.N optical switch.
26. U.S. Pat. No. 5,933,269 Common-lens reflective magneto-optical switch.
27. U.S. Pat. No. 5,903,686 Optical switch module.
28. U.S. Pat. No. 5,864,643 Miniature 1xN electromechanical optical switch and variable attenuator.
29. U.S. Pat. No. 5,828,800 Self-aligned mechanical M.times.N optical switch.
30. U.S. Pat. No. 5,815,614 1xN electromechanical optical switch.
31. U.S. Pat. No. 5,771,321 Micromechanical optical switch and flat panel display.
32. U.S. Pat. No. 5,661,827 Optical switch having a reflector.

Definitions

"Bipolar" refers herein to either a magnetic assemblage with the two poles north and south, or an electric system with + and − charges separated as in an electret.

"Collimated" refers herein to an approximately parallel beam of light.

"Elastomer" is a material such as synthetic rubber or plastic, which at ordinary temperatures can be stretched substantially under low stress, and upon immediate release of the stress, will return with force to approximately its original length.

"Electret" refers to a solid dielectric possessing persistent electric polarization, by virtue of a long time constant for decay of charge separation.

"Electrophoresis or Electrophoretic" is an electrochemical process in which colloidal particles or macromolecules with a net electric charge migrate in a solution under the influence of an electric current. It is also known as cataphoresis.

"Immiscible" herein refers to two fluids which are incapable of mixing.

"Polar gradient" as used herein relates to magnetic reflecting elements that are controlled by a magnetic field gradient mode.

"Monopolar" as used herein denotes mono-charged reflecting elements that are controlled in an electrophoretic mode.

"Multi-wavelength" as used herein denotes the scalability of the instant invention over a range of different wavelength-region-specific embodiments which could operate collectively over a range of the electromagnetic spectrum. This wavelength range extends from the visible $\sim 400 \times 10^{-9}$ m to the microwave region $\sim 30$ cm.

"Rayleigh limit" relates to the optical limit of resolution which can be used to determine the smallest size of the elements that constitute a mini-mirror. Lord Rayleigh discovered this limit from a study of the appearance of the diffraction patterns of closely spaced point sources.

"Spin glass" refers to a wide variety of materials which contain interacting atomic magnetic moments. They possess a form of disorder, in which the magnetic susceptibility undergoes an abrupt change at what is called the freezing temperature for the spin system.

"Switching planar mirror" is a thin almost planar mirror constructed with stepped varying angles so as to have the properties of a much thicker concave (or convex) mirror. It can heuristically be thought of somewhat as the projection of thin equi-angular segments of small portions of a thick mirror upon a planar surface. It is a focusing planar reflecting surface much like a planar Fresnel lens is a focusing transmitting surface. The dynamic-focussing property of an ensemble of tiny elements which make up the switching planar mirror are an essential feature of the instant invention.

"Thermoplastic" refers to materials with a molecular structure that will soften when heated and harden when cooled. This includes materials such as vinyls, nylons, elastomers, fuorocarbons, polyethylenes, styrene, acrylics, cellulosics, etc.

"Translucent" as used herein refers to materials that pass or transmit light of only certain wavelengths so that the transmitted light is colored.

SUMMARY OF THE INVENTION

There are many aspects and applications of this invention, which provides techniques applicable individually or in combination for a novel multi-wavelength switching dynamic mini-mirror ensemble which control the direction in which an electromagnetic radiation signal-beam proceeds to perform switching operations, and to a method of operating the optical switch. This ensemble can operate from optical through microwave wavelengths by electrical, electromagnetic, or magnetic activation, permitting a full unimpeded 180 degree rotation of the beam. Primarily this invention deals with the broad general concept of method and apparatus for two-axis mirror rotation of an electromagnetic beam to perform switching operations by any or several kinds of actuators. As will be described in detail, these objectives may be accomplished by any of a number of ways separately or in combination, as taught by our invention.

It is a general object of this invention to provide a dynamic switching system for electromagnetic beams that operates by reflection.

Another object is to provide an active reflection switching system.

Another objective is to provide a colored active reflection switching system for colored light beams.

One aspect of our invention is to provide a selective color dynamic reflection switching system.

Another object is to provide a novel low-cost wide-spectrum electromagnetic beam switching system.

Other objects and advantages of the invention will be apparent in a description of specific embodiments thereof, given by way of example only, to enable one skilled in the art to readily practice the invention singly or in combination as described hereinafter with reference to the accompanying drawings.

DERAILED DESCRIPTION OF THE PRESENTLY PREFERRED EMBODIMENTS

Figure 1:
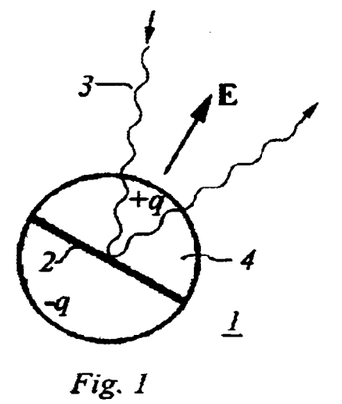
FIG. 1 is a cross-sectional view of an electrically charged bipolar sphere with an equatorial flat reflecting surface. This sphere is one of a multitude of switching elements which actively reflect and focus incident radiation for switching operations.

As is described here in detail, the objectives of the instant invention may be accomplished by any of a number of ways separately or in combination, as taught by our invention FIG. 1 shows a rotatable element 1 of a switching planar mini-mirror with an equatorial flat reflecting surface 2 to actively reflect and focus an incident beam of radiation 3. The element 1 shown is a cross-sectional view of an electrically charged bipolar sphere 4 with charge +q in one hemisphere and charge −q in the opposite hemisphere. This sphere 4, shown here to operate by means of an electric field E, is one of a multitude of rotatable switching elements 1 which reflect and focus incident radiation. The active element 1 may operate in any of many possible modes, such as electrical monopolar, magnetic, polar gradient, or combination thereof. A 90 degree rotation of the active element 1 produces a 180 degree reflection of the incident beam of radiation. Since the angle of reflection is equal to the angle of incidence on the active reflecting element 1, a doubling of the angle is produced.

Figure 2:
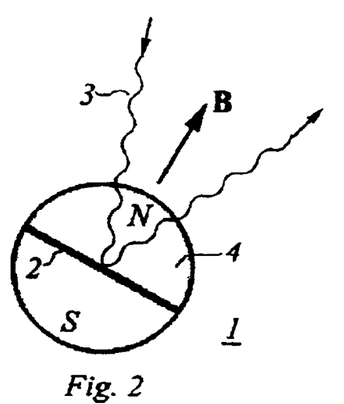
FIG. 2 is a cross-sectional view of a magnetically charged bipolar sphere with an equatorial flat reflecting surface. This sphere is one of a multitude of switching elements, which actively reflect and focus incident radiation for switching operations.

FIG. 2 shows a rotatable active element 1 of a switching planar mini-mirror with a flat equatorial reflecting surface 2 which reflects and focuses a beam of incident radiation 3. The element 1 shown is a cross-sectional view of a magnetically charged bipolar sphere 4 with north magnetic field N in one hemisphere and south magnetic field S in the other hemisphere, that is operated in the magnetic mode. This sphere 4, shown here to operate by means of a magnetic field B, is one of a multitude of active rotatable switching elements 1 which reflect and focus incident light. The material in the top half of element 1 in all the figures needs to be transparent or translucent so the incident radiation can reach the reflecting surface 2.

The active element 1 may also be operated in any of many possible modes, such as electrical monopolar, magnetic, polar gradient, or combination thereof. Two-axis control is possible in mutually orthogonal directions by means of embedded charge +q and −q at top and bottom, and orthogonally embedded magnetic field with north magnetic field N at one end and south magnetic field S at the other end. Two-axis control can also be accomplished with either an E or B field singly with segmented grid and ground plane.

Figure 3:
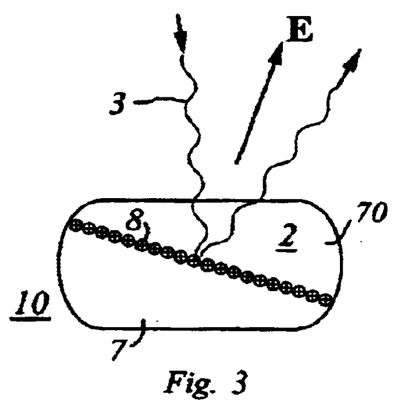
FIG. 3 is a cross-sectional view of a monopolar electric cell filled with two immiscible fluids, and reflecting charged particles of the same sign in the bottom one. This cell is one of a multitude of switching elements which actively reflect and focus incident radiation for switching operations.

FIG. 3 shows a fixed element 10 of a switching planar mini-mirror which is a cross-sectional view of a monopolar electric cell 2 partially filled with a bottom fluid 7 with reflecting charged particles 8 of the same sign (shown here as +, but which could also all be −), and a top transparent fluid 70. The two fluids are immiscible. When an electromagnetic field E is applied, the particles 8 coalesce to form a flat reflecting surface at the interface between fluid 7 and fluid 70, as also influenced by surface tension and meniscus. Fluid 70 could be air, but a transparent fluid of substantially less density than fluid 7 is preferred so that gravity will act to maintain their relative top/bottom orientations. If the particles 8 are small enough to form a colloidal suspension, the density of the particles 8 and the fluid 7 may differ. However, it is generally preferable to have the density of the particles 8 approximately matched to the fluid 7.

The orientation of this flat active reflecting surface formed by the reflecting charged particles 8 can be controlled by an electric field E to reflect incident radiation 3. Until E is applied, as an optional capability the particles 8 and the fluid 7 can function as a transparent window when the particles 8 are nanosize i.e. much smaller than the wavelength of the incident radiation and the fluid 7 is transparent or translucent while they are dispersed in the fluid 7. The transparent, non-reflecting idle state constitutes the non-switching mode for a given mirror. For the case of dispersed transparency, the particles 8 should be <<4000 Å (4×10$^{-7}$ m). This cell 2 is one of a multitude of switching elements 1 which reflect and focus incident radiation 3. The particles 8 may include a wide variety of electomagnetically interactive materials such as electret, optoelectric, conducting, thermoelectric, electrophoretic, resistive, semiconductive, insulating, piezoelectric, magnetic, ferromagnetic, paramagnetic, diamagnetic, or spin (e.g. spin glass) materials. It should be noted that the active reflecting area remains constant for spherical and circular-cylindrical cells, as the orientation of the reflecting surface changes. However, the change in reflecting area with orientation is not a serious problem for the non-spherical, non-circular cell geometry shown.

Figure 4:
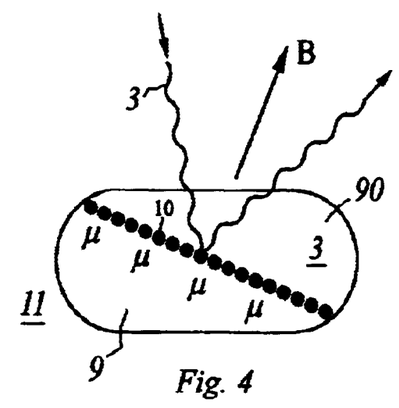
FIG. 4 is a cross-sectional view of a ferrofluid cell partially filled with a colloidal suspension of reflecting ferromagnetic particles in a fluid. This cell is one of a multitude of reflecting elements which actively reflect and focus incident radiation for switching operations.

FIG. 4 shows a fixed element 11 of a switching planar mini-mirror which is a cross-sectional view of a ferrofluid cell 3 partially filled with a ferrofluid 9 containing reflecting ferromagnetic particles 10 of high permeability $\mu$, and a top transparent or translucent fluid 90. The two fluids are immiscible. When an inhomogeneous electromagnetic field B of increasing gradient is applied, the particles 10 are drawn to the region of increasing gradient and coalesce to form an active flat reflecting surface, as shown, at the interface between fluid 9 and fluid 90, as also influenced by surface tension and meniscus. Fluid 90 could be air or a transparent fluid of substantially less density than fluid 9 so that gravity will act to maintain their relative top/bottom orientations. The orientation of the active flat reflecting surface can be controlled by B to reflect incident radiation 3. This cell 3 is one of a multitude of switching elements 1 which reflect and focus incident radiation 3. The particles 10 are small enough to form a colloidal suspension, and are coated to prevent coalescence until B is applied, as is well known in the art. It should be noted that the reflecting area remains constant for spherical and circular-cylindrical cells, as the orientation of the active reflecting surface changes. However, the increase in reflecting area as the fluid 9 is inclined, is not a serious problem for the non-spherical, non-circular cell geometry shown.

Figure 5:
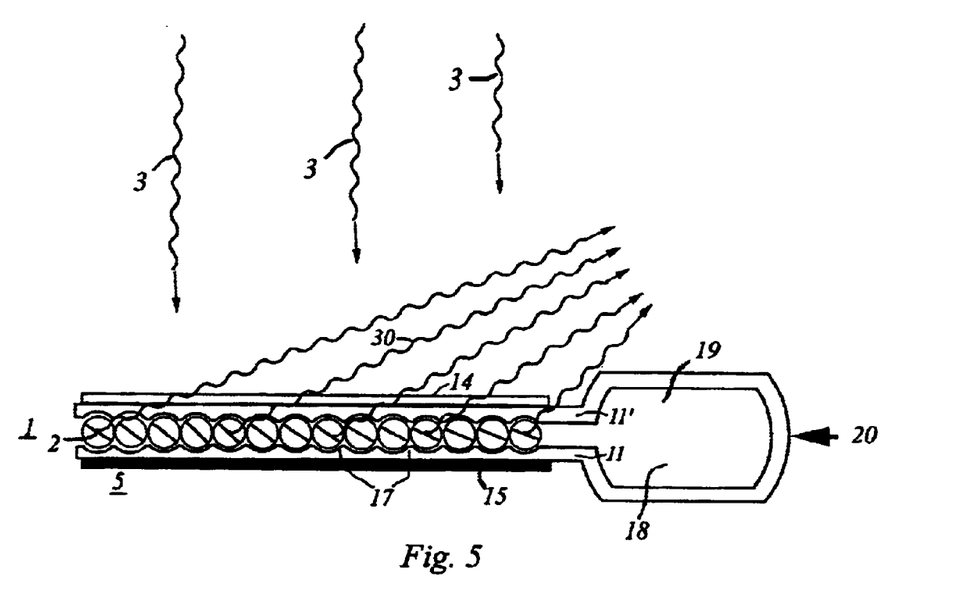
FIG. 5 is a cross-sectional view of an ensemble of switching elements showing the overlay of a transparent ground plane on top and a resistive grid on the bottom to locally produce varying mini-electric fields for orienting the mini-mirrors to actively reflect and focus incident radiation for switching operations.

FIG. 5 is a cross-sectional view of a switching ensemble 5 of an individually rotatable monolayer of elements 1 showing the overlay of a transparent ground plane 14 on top and a resistive grid 15 on the bottom to locally produce time and space varying mini-electric fields for orienting the mini-mirrors 2 to reflect and focus the incident radiation 3 as a beam of radiation of the reflected wave 30. The rotatable elements 1 are situated in ridged cells 17 between two elastomer sheets. For spherical or cylindrical elements 1 the ridged cellular structure 17 is conducive to holding the elements in grid position in the array structure. For elements 1 of disk shape, the ridged cells 17 are a valuable adjunct in maintaining the array structure and avoiding binding between the elements 1. When rotation of the elements 1 is desired, the effect of the torque applied by the field can be augmented by injecting a fluid 18 from a plenum reservoir 19 by a pressure applying means 20 to expand the separation of the sheets 11. It is desirable to utilize a fluid 18 whose index of refraction matches a transparent or translucent hemisphere or hemicylinder. In addition to providing a means to pressure the elastomer sheets 11 apart, the fluid 18 acts as a lubricant to permit the elements 1 to rotate freely when being guided into the proper orientation.

The ridged cells 17 can be created in thermoplastic elastomer sheets 11 by heating the sheets 11 to a slightly elevated temperature and applying pressure with the elements 1 between the sheets 11. In the case of elements 1 of disk shape 5, the ridged cells 17 can be created on each sheet individually. This gives twice the height for the cells, when two such sheets are put together to hold the elements 1.

A presently preferred maximum for the diameter of elements 1 is ~30 cm. The minimum diameter of elements 1 can be assessed from the Rayleigh limit $$d = \frac{0.61\lambda}{n \sin u} \sim 10\lambda,$$

where d is the minimum diameter of elements 1 $\lambda$~4000 Å is the minimum visible wavelength, n is the index of refraction ~1 of element 1 (the medium in which the incident radiation is reflected), and u is the half angle of the radiation beam admitted by elements 1. Thus d ~40,000 Å (4×10$^{-6}$ m) is the minimum diameter of elements 1.

If the switching planar mini-mirrors concentrate the incident radiation by a factor of 100, the total increase in power density at a receiving output channel is 100 times greater than the input signal. Thus a weak input signal can be amplified at the output channel than would otherwise be possible from just one-on-one mirror reflection switching.

Figure 6:
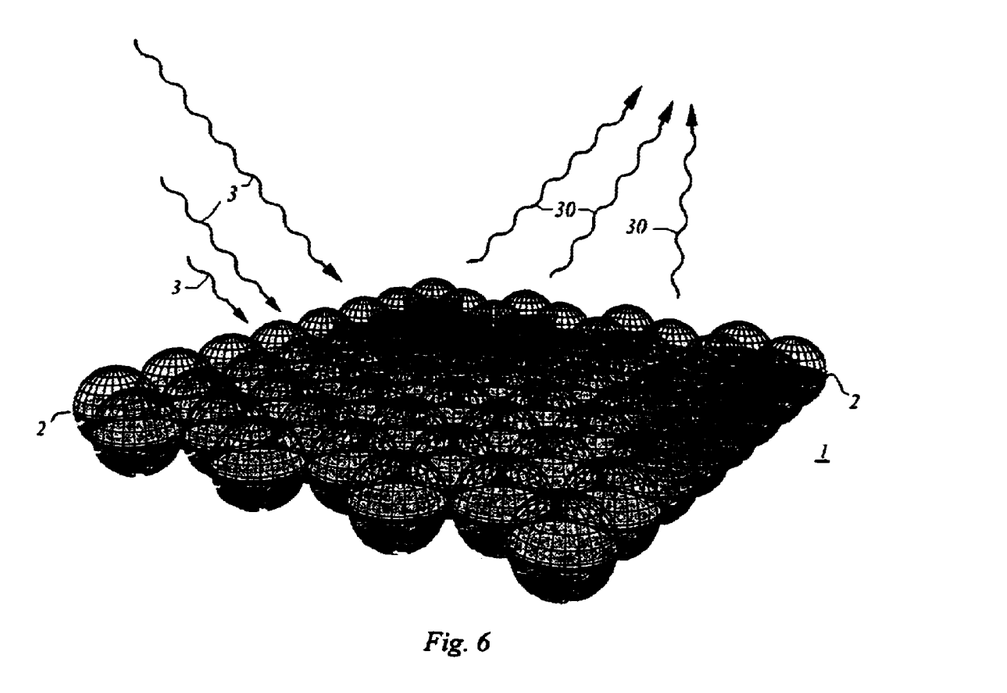
FIG. 6 is a perspective view of a two-dimensional array of the rotatable elements of an actively reflecting and focussing mirror system for switching operations.

FIG. 6 is a perspective view of a two-dimensional array of the rotatable elements 1 of a switching planar mini-mirror with an active equatorial flat reflecting surface 2 which reflects incident radiation 3 and focuses it as concentrated radiation 30 unto a receiving surface.

Figure 7:
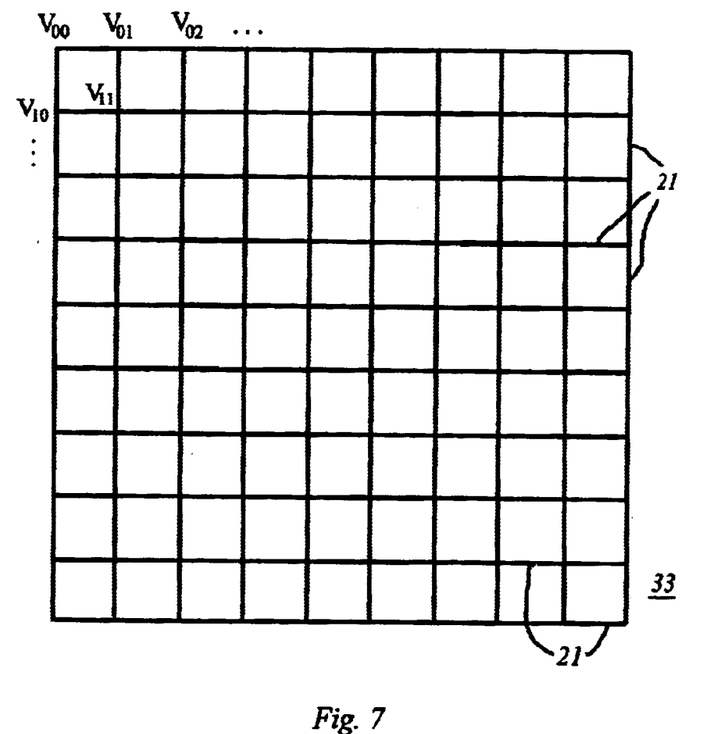
FIG. 7 is a schematic top view showing an electronic control grid for rotating the actively reflecting elements of a focussing planar mirror system for switching operations.

FIG. 7 is a schematic top view showing an electronic control grid 33 for rotating the active reflecting elements of a switching planar mini-mirror. As described in conjunction with FIG. 5, the elements 1 are capable of rotating in any direction (two-axis response) in responding to a selectively applied electric field by the electronic control grid 33. The electronic control grid 33 is made of resistive components 21. The mini-mirror/lens array with elements 1 is sandwiched between the resistive electronic control grid 33 (15 in FIG. 5) shown here in FIG. 7 and the transparent ground plane 14 as shown in the cross-sectional view of FIG. 6. The orientation of the elements 1 (cf. FIG. 5) is determined by controlling the voltages V at the nodes of the grid such as those shown $V_{00}$, $V_{01}$, $V_{02}$, $V_{10}$, $V_{11}$, with voltage $V_{ij}$ at the ij th node. The voltage $V_{ij}$ can be controlled by a small inexpensive computer with analog voltage outputs. The electronic control grid 33 is similar in construction and function to analogous grids used in personal computer boards, and in flat panel monitors. Similarly, small offset ferritic current loops around each cell and segmented ground plane can provide local magnetic fields for the orientation function of elements with magnetic dipoles to line up with the net external magnetic vector.

The voltage between successive nodes produces an electric field in the plane of the planar mini-mirror, and the voltage between a node and the ground plane produces an electric field perpendicular to the planar mini-mirror to control the orientation angle of the active reflecting/switching mini-mirrors. In the case of elements 1 which contain a combination of orthogonal electrical and magnetic dipoles (cf. FIGS. 1 and 2), the orientation function may be separated for orientation in the plane and orientation perpendicular to the plane by each of the fields.

After being positioned for desired switching angles of reflection, active elements 1 may be held in place by the elastomer sheets 11 (cf. FIG. 5) with the voltages $V_{ij}$ being turned off to eliminate unnecessary power dissipation during non-varying operation.

As described in conjunction with FIG. 5, when variable operation is resumed, new angular orientation of the switching elements 1 and 2 is desirable, the sheets 11 (cf. FIG. 5) are separated by injecting a fluid 18 from a plenum reservoir 19 by a pressure applying means 20. In the case of elements 10 (cf. FIG. 3) the reflecting angle needs to be held fixed by the control function such as the electronic control grid 33. To minimize power dissipation in this case it is desirable to make resistive components 21 highly resistive so that a given voltage drop is accomplished with a minimum of current flow and hence with a minimum of power dissipation.

Figure 8:
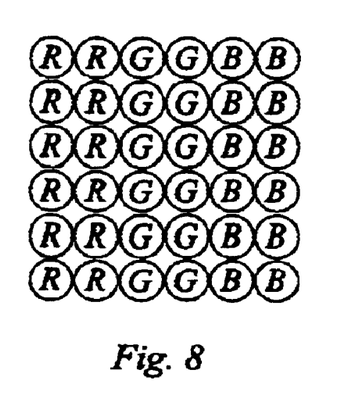
FIG. 8 shows a 6×6 array of actively reflecting select frequency elements illustrated by red, green and blue balls.
Figure 9:
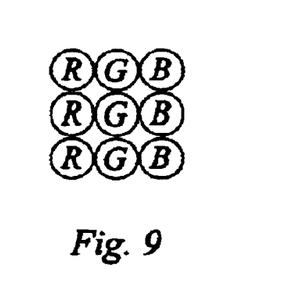
FIG. 9 shows a 3×3 array of actively reflecting select frequency elements illustrated by red, green and blue balls.
Figure 10:
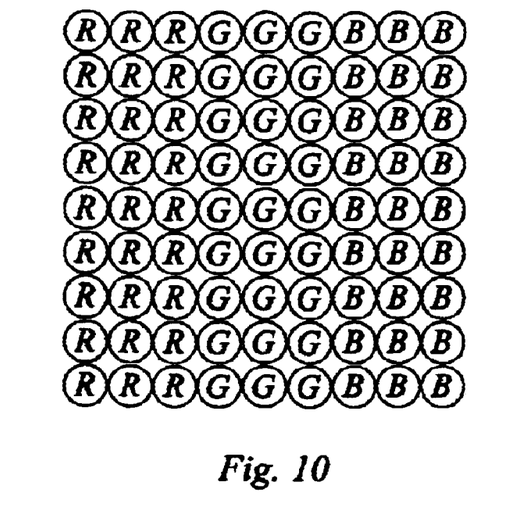
FIG. 10 shows a 6×6 array of actively reflecting select frequency elements illustrated by red, green and blue balls.

FIG. 8 is a cross-sectional top view showing a 6×6 array of actively reflecting subgroup of select frequency elements illustrated by red, green and blue balls. The size of the switching subgroup array may be smaller, such as 3×3, as shown in FIG. 9. Or the switching subgroup array may be larger, such as the 9×9 array as shown in FIG. 10. The colors shown are only meant to be illustrative of different frequencies, and more than three different frequencies may be used. In FIG. 9, there are 3 red balls, 3 green balls, and 3 blue balls. In FIG. 10, there are 27 balls of each of the colors. A given ball can either add to the amount of light falling on a collector to amplify the signal, or it can be eliminated. Elimination is achieved by either 180° rotation of a ball so that no radiation is reflected from it; or rotation by an angle less than 180°, that serves to remove the radiation reflected from it to a non-critical location; or the transparency non-reflecting idle state such as described in conjunction with FIG. 3.

Since the balls may be individually rotated, for a given ensemble of balls in the switching reflection array, the number of balls contributing to a given color output channel may be varied and may come from various non-contiguous locations in the array, as long as they are focussed on the same collecting surface of a given output channel. Thus it is possible to utilize all the balls, as the color signal from a given ball may activate and be combined with those from distant balls to go to a given collector.

If a color (given frequency) signal is desired when the source is neutral such as white light, this can be achieved by reflection from mirrored colored balls. The process has similarity to wavelength division multiplexing. Neutral (uncolored) transparent balls with active reflecting mirrors can form colored signals when the radiation incident on them is colored.

Figure 11:
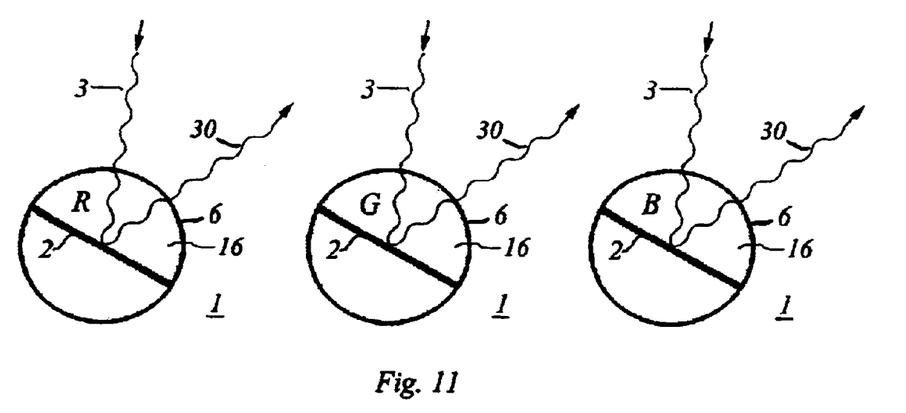
FIG. 11 is a cross-sectional view of three actively switching translucent spheres, each with an equatorial flat reflecting surface. The spheres are each red, green, and blue to form part an array of actively reflecting elements for switching operations.

FIG. 11 is a cross-sectional view of three actively switching translucent spherical elements 1, each with an equatorial flat reflecting surface. The top hemispheres of spheres 1 are each a select frequency as herein illustrated by red, green and blue to form part of a dynamic ensemble of reflecting color elements for switching. The incident radiation 3 is transmitted (passes) through the outer translucent surface 6 and through the translucent medium 16 to the reflecting surface 2. The reflected radiation 30 then goes out through the medium 16 and the outer surface 6. The outer surface 6 and the medium 16 may both be of the same translucent color, or one may be transparent and the other translucent. Light 30 that is of a given frequency e.g. red, green, and blue respectively is shown emerging left to right from the spherical elements 1.

Figure 12:
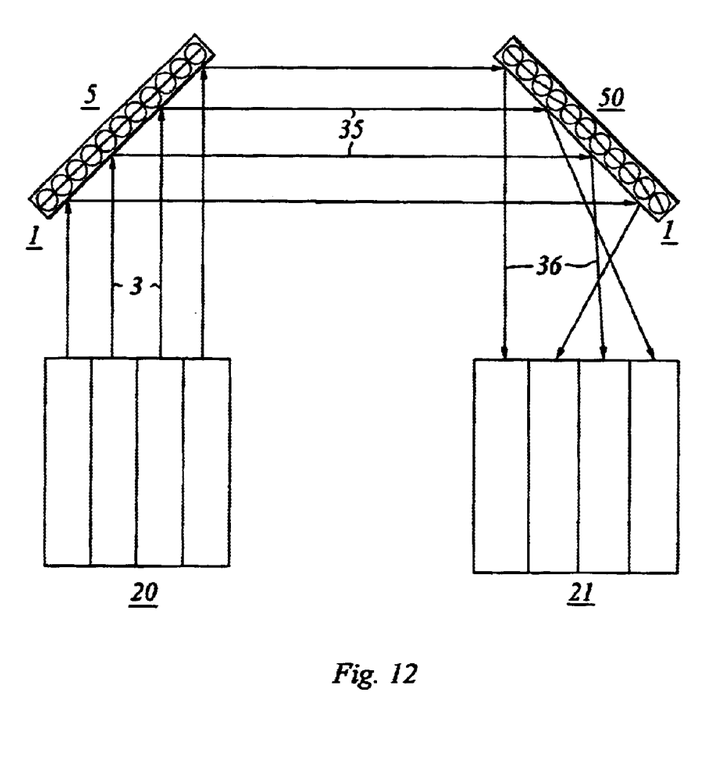
FIG. 12 is a cross-sectional illustration of a multi-channel reflection matrix switch which utilizes the ensemble of dynamic reflecting elements for switching operations.

FIG. 12 is a cross-sectional illustration of a multi-channel reflection matrix switch 5 which utilizes an ensemble of dynamic reflecting elements 1 for switching operations over a broad operational range of radiation frequencies from optical to microwave. Optical beams may be collimated by lenses or lasers. Microwave beams may be collimated by wave guides. The lenses, lasers, or wave guides are not shown, since these are well known to those versed in the art. Shown are N input channels 20, sending collimated radiation beams 3, to a reflection matrix switch 5. Said switch 5 selectively reflects said radiation beams 3, so that switched beams 35 are transmitted to a second reflector 50, shown here as a reflection matrix switch. For some applications, the second reflector 50 may also be an ordinary reflecting surface like a mirror, or even the receiving output channels. The signal from reflector 50 is transmitted to the output channels 21 by means of the reflected beams 36. The output channels 21 may thus be electrically isolated from the input channels 20 since there need be no direct electrical connection between them. The matrix switches 5 and 50 are controlled by input signals to an electronic control grid such as shown in FIG. 7.

The integrity process is that of color filtering to furnish a method for light beams which eliminates the possibility of undesirable switching which occurs in some systems due to malfunctioning or defective equipment, or extraneous electromagnetic, or mechanical signals. The integrity process is provided by the reflecting color balls as described in conjunction with FIGS. 8–11, since a given color (frequency) can only be transmitted into the same color (frequency) element, and reflected therefrom.

Figure 13:
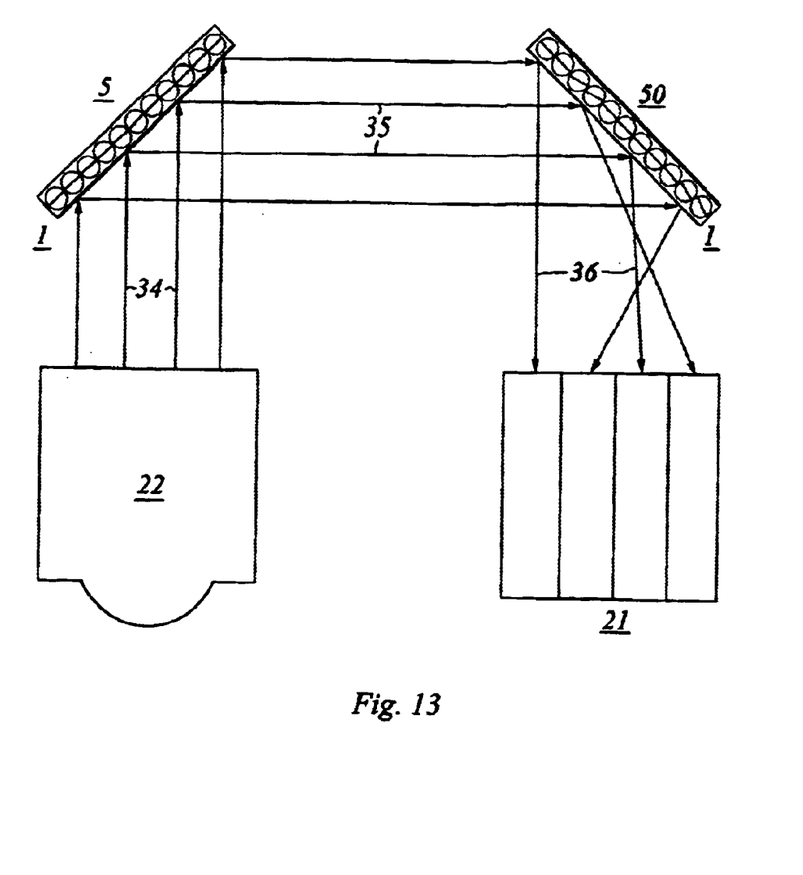
FIG. 13 is a cross-sectional illustration of a multi-channel refection matrix switch with an independent radiation source which utilizes the ensemble of dynamic reflecting elements for switching operations.

FIG. 13 is a cross-sectional illustration of a multi-channel refection matrix switch 5 which utilizes an ensemble of dynamic reflecting elements 1 for switching operations over a broad operational range of frequencies. Shown is an independent radiation source 22, sending a collimated beam 34, to a refection matrix switch 5 operated by electronic input channels to activate an electronic control grid such as shown in FIG. 7. Said switch 5 selectively reflects said radiation beam 34, so that a switched beam 35 is transmitted to a second reflector 50, shown here as a refection matrix switch. For some applications, the second reflector 50 may also be an ordinary reflecting surface like a mirror, or even the receiving output channels. The signal from reflector 50 is transmitted to the output channels 21 by means of the reflected beams 36. The output channels 21 may thus be electrically isolated from the input channels 20 since there need be no direct electrical connection between them. The matrix switch 50 is controlled by input signals to an electronic control grid such as shown in FIG. 7. The collimating lenses, lasers, or wave guides are not shown, since these are well known to those versed in the art.

While the instant invention has been described with reference to presently preferred and other embodiments, the descriptions are illustrative of the invention and are not to be construed as limiting the invention. Thus, various modifications and applications may occur to those skilled in the art without departing from the true spirit and scope of the invention as summarized by the appended claims.

What is claimed is:

1. An electromagnetic radiation signal switch comprising:
   (a) a plurality of radiation input ports for receiving a plurality of radiation input signals, and a plurality of radiation output ports for collecting a plurality of output radiation signals;
   (b) a first sheet made of substantially transparent material, and a second sheet which is disposed substantially parallel to said first sheet;
   (c) a monolayer of rotatable elements, each of which comprises an embedded reflector, and an embedded electric dipole in said element;
   (d) wherein each said reflector is disposed in a cellular structure positioned between said first and second sheets;
   (e) wherein each said reflector is individually and independently rotatable about at least one of two orthogonal axes;
   (f) wherein a transparent ground-plane electrode layer is provided on a surface of said first sheet, and a resistive electrical grid layer is provided on a surface of said second sheet to cooperatively produce an arrangement of temporally and spatially varying electric fields for orienting said bipolar reflectors about each of the aforesaid two axes; and
   (g) said rotatable reflectors substantially reflecting at least a portion of said optical inputs.

2. The apparatus of claim 1, wherein said elements are balls.

3. The apparatus of claim 1, wherein said elements are disks.

4. The apparatus of claim 1, wherein said elements are colored.

5. The apparatus of claim 1, wherein said sheets maintain said reflectors in fixed azimuthal orientation.

6. The apparatus of claim 1, with means for spreading apart said sheets.

7. The apparatus of claim 1, wherein the diameter of each said reflector is in the range $4 \times 10^{-6}$ m to 0.3 m.

8. The apparatus of claim 1, wherein the wavelength range of said radiation is $4 \times 10^{-6}$ m to 0.3 m, corresponding to a frequency range of $10^{14}$ Hz down to $10^{9}$ Hz.

9. The apparatus as defined in claim 1, wherein said reflectors are frequency selective.

10. An electromagnetic radiation signal switch comprising:
    (a) a plurality of radiation input ports for receiving a plurality of radiation input signals, and a plurality of radiation output ports for collecting a plurality of output radiation signals;
    (b) a first sheet made of substantially transparent material, and a second sheet which is disposed substantially parallel to said first sheet;
    (c) a monolayer of rotatable elements, each of which comprises an embedded reflector, and an embedded magnetic dipole in said element;
    (d) wherein each said reflector is disposed in a cellular structure positioned between said first and second sheets;
    (e) wherein each said reflector is individually and independently rotatable about at least one of two orthogonal axes;
    (f) wherein a transparent segmented ground-plane electrode layer is provided on a surface of said first sheet, and a resistive electrical segmented grid layer is provided on a surface of said second sheet to cooperatively produce an arrangement of temporally and spatially varying magnetic fields for orienting said bipolar reflectors about each of the aforesaid two axes; and
    (g) said rotatable reflectors substantially reflecting at least a portion of said optical inputs.

11. The apparatus of claim 10, wherein said elements are ellipsoidal.

12. The apparatus of claim 10, wherein said elements are wavelength selective.

13. An optical switch comprising:
    a) a plurality of ports for transmitting and receiving an optical signal;
    b) a first sheet made of substantially transparent material, and a second sheet which is disposed substantially parallel to said first sheet;
    c) a monolayer of rotatable reflectors, each of which includes embedded dipole;
    d) wherein each said reflector is disposed in a cellular structure positioned between said first and second sheets;
    e) wherein each said reflector is individually and independently rotatable about at least one of two orthogonal axes;
    f) wherein a transparent segmented ground-plane electrode layer is provided on a surface of said first sheet, and a resistive segmented electrical grid layer is provided on a surface of said second sheet to cooperatively produce an arrangement of temporally and spatially varying fields for orienting said reflectors about each of the aforesaid two axes;
    g) a first rotatable reflector for receiving the optical signal from at least one of the plurality of ports and for substantially reflecting at least a portion of the optical signal to another of the plurality of ports; and
    h) a second rotatable reflector selectably positionable between at least one of the plurality of ports and said first rotatable reflector, for selectably redirecting the optical signal from one of the plurality of ports to another of the plurality of ports said second rotatable reflector selectably repositionable to a first selectable position out of an optical path of the optical signal and at a second selectable position in the optical path of the optical signal.

14. The apparatus of claim 13, wherein said dipole is an electric dipole.

15. The apparatus of claim 13, wherein said dipole is a magnetic dipole.

16. A method of switching electromagnetic radiation signals by an array of reflectors, comprising the steps of:
   (a) providing a plurality of radiation input ports for receiving a plurality of radiation input signals, and a plurality of radiation output ports for collecting a plurality of output radiation signals;
   (b) providing a first sheet made of substantially transparent material, and a second sheet which is disposed substantially parallel to said first sheet;
   (c) providing a monolayer of cells, each of which comprises an embedded reflector, and having a magnetic multipole coupling means embedded in said element;
   (d) providing each said reflector in a cellular structure positioned between said first and second sheets;
   (e) providing each said reflector to be individually and independently rotatable about at least one of two orthogonal axes disposed in the plane of said sheets;
   (f) providing a transparent ground-plane segmented electrode layer on a surface of said first sheet, and a resistive segmented electrical grid layer on a surface of said second sheet to cooperatively produce an arrangement of temporally and spatially varying magnetic fields for coupling to the magnetic multipoles and orienting said reflectors about each of the aforesaid two orthogonal axes.

17. The method of claim 16 further comprising the step of rotating an array of reflectors comprising electric multipole spheres.

18. The method of claim 16 further comprising the step of rotating an array of reflectors comprising magnetic multipole spheres.

19. A method for configuring a signal path in an optical switching device that enables selective connection of optical signals received from a plurality of of reflectors, comprising the steps of:
   (a) providing a plurality of input ports for receiving a plurality of optical input signals, and a plurality of optical output ports for collecting a plurality of output optical signals;
   (b) providing a first sheet made of substantially transparent material, and a second sheet which is disposed substantially parallel to said first sheet;
   (c) providing a monolayer of cells, each of which comprises an embedded reflector, and having an electric multipole embedded in said element;
   (d) providing each said reflector in a cellular structure positioned between said first and second sheets;
   (e) providing a transparent ground-plane electrode layer on a surface of said first sheet, and a resistive electrical grid layer on a surface of said second sheet to cooperatively produce an arrangement of temporally and spatially varying electric fields for coupling to the electric multipoles and orienting said reflectors about an independent combination of two axes
   (f) rotating each said reflector individually and independently about at least one of the aforesaid two axes disposed in the plane of said sheets.

20. The method of claim 19, wherein the diameter of each said reflector is in the range $4 \times 10^{-6}$ m to 0.3 m.

21. The method as defined in claim 16, wherein said reflectors are frequency selective.

* * * * *